United States Patent [19]
Asao et al.

[11] Patent Number: 5,742,107
[45] Date of Patent: Apr. 21, 1998

[54] ROTARY COOLING FAN

[75] Inventors: Yoshihito Asao; Katsumi Adachi, both of Himeji, Japan

[73] Assignee: Mitsubishi Denki Kabushiki Kaisha, Tokyo, Japan

[21] Appl. No.: 360,454

[22] Filed: Dec. 21, 1994

[30]  Foreign Application Priority Data

Dec. 28, 1993 [JP] Japan .................. 5-335955

[51] Int. Cl.⁶ .............. H02K 9/04; H02K 9/06; B63H 3/00; B63H 1/06
[52] U.S. Cl. .............. 310/62; 310/63; 416/44; 416/135
[58] Field of Search .............. 310/62, 63, 153; 416/44, 135

[56]  References Cited

U.S. PATENT DOCUMENTS

| | | | |
|---|---|---|---|
| 2,601,495 | 6/1952 | Bell | 170/160.11 |
| 2,719,000 | 9/1955 | Thevenaz | 416/135 |
| 3,358,773 | 12/1967 | Oldberg | 416/135 |
| 3,373,930 | 3/1968 | Rom | 230/270 |
| 4,464,594 | 8/1984 | Matsumoto et al. | 310/63 |
| 5,118,978 | 6/1992 | Matsumoto et al. | 310/153 |

FOREIGN PATENT DOCUMENTS

| | | | |
|---|---|---|---|
| 103042 | 3/1984 | European Pat. Off. | 416/44 |
| 530231 | 12/1921 | France | 416/135 |
| 782935 | 7/1935 | France . | |
| 1300193 | 6/1965 | Germany . | |
| 2446463 | 4/1976 | Germany . | |
| 3143686 | 5/1983 | Germany | 416/135 |
| 3219930 | 12/1983 | Germany | 416/135 |

*Primary Examiner*—Clayton E. LaBalle
*Attorney, Agent, or Firm*—Sughrue, Mion, Zinn, Macpeak & Seas, PLLC

[57]  ABSTRACT

A rotary fan includes a rotatable base plate, a plurality of fan blades mounted rotatably on the base plate at a peripheral portion thereof by means of supporting studs, and a blade angle adjusting mechanism mounted in association with each of the fan blades for allowing the fan blade to rotate pivotally about the supporting stud under a centrifugal force acting on the fan blade such that the rate of increase of the air quantity produced by the fan blade decreases as a rotation number of the rotatable base plate increases within a predetermined high-speed rotation range of the rotatable base plate, while in other rotation speed range outside of the high-speed rotation range, the blade angle adjusting mechanism acts to suppress the rotation of the fan blade around the supporting stud. Noise generated by the rotary fan can significantly be reduced while ensuring a sufficient quantity of air flow.

12 Claims, 14 Drawing Sheets

AIR FLOW →

DIRECTION OF ROTATION

DIRECTION OF ROTATION

DIRECTION OF ROTATION

DIRECTION OF ROTATION

ROTARY COOLING FAN

BACKGROUND OF THE INVENTION

1. Field of the Invention

The present invention generally relates to a structure of a rotary fan for producing air flow or air streams by rotation. More particularly, the invention is concerned with a rotary fan for an alternating current generator (hereinafter also referred to as the AC generator), which fan is rotated together with a rotatable shaft of the AC generator for carrying away heat generated therein by air streams produced by the fan. The AC generator equipped with the cooling fan according to the invention can be implemented in a small size and profitably find application to motor vehicles or automobiles.

2. Description of Related Art

In the industrial field of the motor vehicles or cars, there arises in recent years a trend for reducing more and more the space to be allocated to an engine room in an effort to increase correspondingly the room for a driver and passenger(s) so that they can feel comfortableness in riding in the car. As a result of this, the internal combustion engine as well as accessaries thereof and many other parts have to be installed within the engine room in congestion with a high density. Thus, there also exists a demand for implementation of the AC generator for the motor vehicle in a small size. On the other hand, with a view to ensuring a high safety for maneuvering of the motor vehicle as well as availability of intelligent facilities, electronic controls for the devices accommodated within the engine room are increasingly adopted, being accompanied with increase in the electric power consumption. Under the circumstances, high temperature tends to prevail within the engine room, which is of course undesirable. For coping with this problem, the AC generator is also required to be improved in respect to the cooling structure.

As the cooling means for the AC generator for the motor vehicle, there is generally adopted an enforcive air cooling structure in which the air is forcibly circulated through the AC generator by a cooling fan which is rotated together with a shaft of the AC generator.

For having better understanding of the background of the invention, description will first be directed to an air-cooling type AC generator for the motor vehicle known heretofore.

FIG. 22 is a sectional view showing a conventional air-cooling type AC generator which is mounted in association with an internal combustion engine of a motor vehicle in such disposition that the right-hand side of the AC generator as viewed in the figure is positioned at the front side of the engine (not shown).

Referring to the figure, a rotatable shaft 110 of the AC generator is rotatably supported by bearings 114 and 115 mounted at center portions of front and rear brackets 112 and 113 which are fittingly secured to a stator core 111 of the AC generator. A pulley 116 is mounted fixedly on the rotatable shaft 110 at a front end portion thereof, wherein engine torque is transmitted to the shaft 110 of the AC generator via a transmission belt (not shown) extending around the pulley 116. Secured to the rotatable shaft 110 is a magnetic core assembly 117 having an excitation winding 118 wound around a core. Disposed in opposition to a magnetic core assembly 117 is a stator core 111 wound with a stator winding 119. Further, there are mounted internally of the rear bracket 113 a full-wave rectifier 120 for rectifying an AC power induced in the stator winding 119 and a voltage regulator 121 for Controlling the output voltage of the AC generator.

Disposed within the AC generator of the structure described above are rotary fans 100 each of a one-side suction type, which are mounted to front and rear end surfaces of the magnetic core assembly 117 so as to rotate together with the magnetic core assembly 117 as an integral unit. Thus, when the rotary fan 100 mounted on the front end surface of the magnetic core assembly 117, the ambient air is caused to flow into the AC generator through an intake port 122 formed in the front bracket 112, as indicated by arrows, whereby the stator winding 119 and other components of the AC generator are cooled. The air carrying the heat generated within the AC generator flows outwardly through a discharge port 123. Furthermore, by the rotation of the rotary fan 100 secured to the rear end surface of the magnetic core assembly 117, the ambient air is taken in through intake ports 124 and 125 under the air-drawing action of the rotating fan 100 and caused to flow circulatively through the interior of the AC generator and cool the full-wave rectifier 120 and the voltage regulator 121 to be finally discharged through a discharge port 126.

Heretofore, the rotary fan of the type mentioned above is implemented in such a structure as shown in FIG. 23.

Referring to the figure, the illustrated rotary fan 100 is comprised of a base plate 101 which is adapted to be fixedly mounted to the magnetic core assembly 117 of the AC generator and a plurality of projecting fan blades 102 formed in a row in the rotatable base plate 101 along the outer periphery thereof.

The fan blades 102 are formed integrally with the rotatable base plate 101. More specifically, the rotatable base plate 101 and the fan blades 102 are integrally formed of a sheet metal by a blanking press, whereupon the fan blades 102 are bent orthogonally to the plane of the base plate 101 in such orientation that they extend obliquely relative to the radial direction of the rotatable base plate 101. In other words, the plural fan blades 102 are formed in the form of a circumferential row along the outer peripheral edge of the rotatable base plate 101 by blanking a single sheet metal. Thus, the discharge angle θ of the fan blade 102 always remains constant independent of the rotation speeds of the rotary fan 100. Parenthetically, the discharge angle θ indicates an angle formed between a straight line connecting the center of the base plate 101 and an outermost peripheral point of the fan blade 102 located at the front side thereof as viewed in the rotational direction of the base plate 101 and a line tangential to that outermost peripheral point.

In the fan blade 100 for the AC generator of the motor vehicle known heretofore, the discharge angle θ of the fan blade 102 always remains constant independent of the rotation of the rotary fan 100. As a result of this, the air quantity as produced by the fan 100 increases linearly in proportion to the rotation speed (rpm) of the rotary fan 100, as indicated by a broken-line characteristic curve in FIG. 8, as a result of which noise generated by the rotary fan 100 becomes more and more noticeable as the air quantity (or air volume in m³/min) increases.

Furthermore, it can be seen from FIG. 8 that the output current of the AC generator increases steeply as a function of the rotation number in a low speed range (e.g. not higher than 4000 rpm), while in a high speed range (e.g. higher than 4000 rpm), the output current of the AC generator increases only gently. Similarly, the temperature of the AC generator increases as the output current thereof increases. However, the rate of the temperature rise becomes gradually lower when a certain rotation number (e.g. 4000 rpm) is exceeded.

For these reasons, when the discharge angle θ is selected so that a sufficient air quantity for cooling the AC generator is available in a low speed range, the air quantity produced by the rotary fan 100 will increase unnecessarily and wastefully to an excessively high level in the high speed range, which is accompanied with a problem that a tremendous noise is generated.

On the other hand, when the discharge angle θ is so selected that the air quantity remains at a minimum necessary rate in the high speed range with a view to suppressing the noise in the high speed range, there can no more be obtained a sufficient air quantity in the low speed range, incurring a high temperature rise of the AC generator, whereby the output current of the AC generator is limited, giving rise to another problem.

SUMMARY OF THE INVENTION

In the light of the state of the art described above, it is an object of the present invention to provide a rotary fan which can ensure availability of a sufficient air quantity even in a low speed range, while mitigating noise generation in a high speed range.

In view of the above and other objects which will become apparent as description proceeds, there is provided according to a general aspect of the present invention a rotary fan which includes a rotatable base plate, a plurality of fan blades mounted rotatably on the base plate at a peripheral portion thereof by means of supporting studs, and a blade angle adjusting mechanism mounted in association with each of the fan blades for allowing the fan blade to rotate pivotally about the supporting stud under a centrifugal force acting on the fan blade such that rate of increase of the air quantity or air volume produced by the fan blade decreases as a rotation number of the rotatable base plate increases in a predetermined high-speed rotation range of the rotatable base plate, while in other rotation speed range outside of the high-speed rotation range, the blade angle adjusting mechanism acts to suppress the rotation of the fan blade around the supporting stud.

With the structure of the rotary fan described above, rotation or swing of the fan blade around the supporting stud is suppressed at the rotation speed lying outside of the predetermined high-speed rotation range of the rotatable base plate, whereby the air quantity (or air flow in M³/min) as generated by the fan blades increases linearly in proportion to the increase of the rotation number of the rotatable base plate. However, in the predetermined high-speed range of the rotatable base plate, each of the fan blades swings or rotates around the supporting stud as a function of the increase of the centrifugal force applied to the fan blade during the rotation of the base plate, as a result of which the rate of increase of the air quantity produced by the fan blades decreases as the rotation number of the base plate increases, whereby generation of noise is correspondingly suppressed.

In a preferred mode for carrying out the invention, the blade angle adjusting mechanism may include an urging means for urging the fan blade in opposite direction to the centrifugal force applied to the fan blade, a first stopper means for limiting the rotation of the fan blade under the urging force of the urging means, and a second stopper means for limiting the rotation of the fan blade taking place under the centrifugal force applied to the fan blade, wherein a discharge angle defined by an angle formed between a straight line extending between an outermost peripheral point on a side surface of the fan blade located at a front side as viewed in a direction of the rotation of the base plate and a center thereof and a line extending tangentially to the outermost peripheral point is regulated in dependence on the rotation number of the base plate within the predetermined high-speed rotation range.

In the rotary fan of the structure described above, each of the fan blades is urged to bear against the first stopper means by the urging means to be thereby prevented from rotation until the rotation number of the rotatable base plate has reached the predetermined high-speed rotation range, while in the predetermined high-speed rotation range of the base plate, the fan blade is caused to rotate or swing around the supporting stud between the first stopper means and the second stopper means as the centrifugal force increases. When the rotation number of the base plate increases beyond the predetermined high-speed rotation range (i.e., when the rotation speed of the base plate increases up to a very high-speed rotation range), the rotation of the fan blade under the centrifugal force is stopped by the second stopper means, as a result of which the air quantity is prevented from decreasing below a necessary minimum level, while in the low rotation speed range, the air quantity can be set at a most proper level.

The rotation speeds of the base plate which define the predetermined high-speed rotation range mentioned above may preferably be determined by selectively forming at least one cavity in the fan blade to adjust a position of the center of gravity on the fan blade.

With the arrangement mentioned above, the high-speed rotation range can easily be set up. Besides, since the fan blade can be implemented in light weight, magnitude of the centrifugal force effective for rotating the fan blade around the supporting stud as well as inertia of the rotary fan as a whole can be decreased, which is advantageous for inexpensive manufacture of the rotary fan. Additionally, the urging means may be constituted by a torsion coil spring of a small spring constant and light weight, whereby high response can be realized in the air quantity regulation.

In another preferred mode for carrying out the invention, a cross-sectional shape of the fan blade and a position of a center of rotation of the fan blade around the supporting stud may be selected such that the discharge angle of the fan blade increases as the centrifugal force increases in the predetermined high-speed rotation range of the base plate.

With the structure of the rotary fan described above, the discharge angle increases as the centrifugal force increases, as a result of which the rate of increase of the air quantity is correspondingly decreased in the high-speed rotation range due to the appropriate cross-sectional shape of each fan blade and the proper position selected as the center of rotation for the fan blade.

In yet another mode preferred for carrying out the invention, a cross-sectional shape of the fan blade and a position of the center of rotation of the fan blade around the supporting stud may be selected such that the discharge angle of the fan blade decreases as the centrifugal force increases in the predetermined high-speed rotation range of the base plate.

In the rotary fan of the structure mentioned above, discharge angle becomes smaller as the centrifugal force increases within the predetermined high-speed rotation range of the base plate owing to the appropriate cross-sectional shape of the fan blade and the proper setting of the position of the center of rotation of the fan blade, whereby the increase rate of the air quantity can be decreased.

In still another preferred mode for carrying out the invention, a cross-sectional shape of the fan blade and a position of a center of rotation of the fan blade around the supporting stud may be selected such that a maximum effective diameter of the rotary fan defined by outermost peripheral points on front side surfaces of the fan blades as viewed in the rotational direction of the base plate decreases as the centrifugal force increases within the predetermined high-speed rotation range.

With the structure of the rotary fan implemented as described above, the fan blade is rotated in the direction in which the radius of the rotary fan defined by the outermost peripheral point decreases by imparting appropriate cross-sectional shape to the fan blade and selecting appropriately the center of rotation of the fan blade, whereby the increasing rate of the air quantity as well as noise generation can further be reduced over the predetermined high-speed rotation range.

In a further preferred mode for carrying out the invention, the urging means of the blade angle adjusting mechanism may be housed within the fan blade.

By housing within the fan blade the urging means (which may otherwise disturb air streams along the surfaces of the fan blades) such that substantially no portion of the urging means projects outwardly from the surface of the fan blade, the air can flow smoothly along the surfaces of the fan blades, whereby the noise generation can be suppressed more effectively. Thus, operation efficiency of the rotary fan can further be enhanced. In this conjunction, the urging means may advantageously be constituted by a torsion coil mounted or wound around the supporting stud and having one end secured to the fan blade and the other end secured to one of the first or second stopper formed in the rotatable base plate for limiting the rotation of the fan blade, as mentioned above. In this case, the urging means can easily be housed within the fan blade.

In a yet further preferred mode for carrying out the invention, a fan guide member may fixedly be secured to the supporting studs at one end thereof, the other ends of which may be fixedly secured to the rotatable base plate.

With the structure of the rotary fan described above, rigidity of the supporting studs can be reinforced by the fan guide member, whereby the mechanical strength and the vibration withstanding capability of the rotary fan are enhanced as a whole. Further, owing to the air stream rectifying action of the fan guide member, the noise generation can further be suppressed while the fan operation efficiency is enhanced.

In a still further preferred mode for carrying out the invention, each of the fan blades may have a streamline contour in cross section.

In the rotary fan of the structure described above, the air can flow smoothly along the lateral surfaces of the fan blades without being disturbed owing to the implementation of the fan blade with the streamline contour in cross section. Thus, the noise generation can be suppressed more effectively, which contributes to further improvement of the operation efficiency of the rotary fan.

Further, the invention is directed to an electric generator equipped internally with a rotary fan for cooling the generator.

Thus, there is provided according to another aspect of the invention an electric generator which includes a stator assembly, a rotor assembly having a shaft driven by a driving source, and at least one rotary fan mounted at an end surface of the rotor assembly so as to be rotatable together with the rotor assembly for producing a quantity of air flowing through the interior of the electric generator for cooling the same, wherein the rotary fan is comprised of a rotatable base plate, a plurality of fan blades mounted rotatably on the base plate at a peripheral portion thereof by means of supporting studs, and a blade angle adjusting mechanism mounted in association with each of the fan blades for allowing the fan blade to rotate pivotally about the supporting stud under a centrifugal force acting on the fan blade such that the rate of increase of the air quantity produced by the fan blade decreases as a rotation number of the rotatable base plate increases in a predetermined high-speed rotation range of the base plate, while in other rotation speed range outside of the high-speed rotation range, the blade angle adjusting mechanism acts to suppress the rotation of the fan blade around the supporting stud.

The electric generator of the structure described above can be implemented in a reduced size while enjoying a high self-cooling capability, and thus can find a profitable use in applications where the space available for installing the generator is restricted such as in the motor vehicle or the like.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Figure 1:
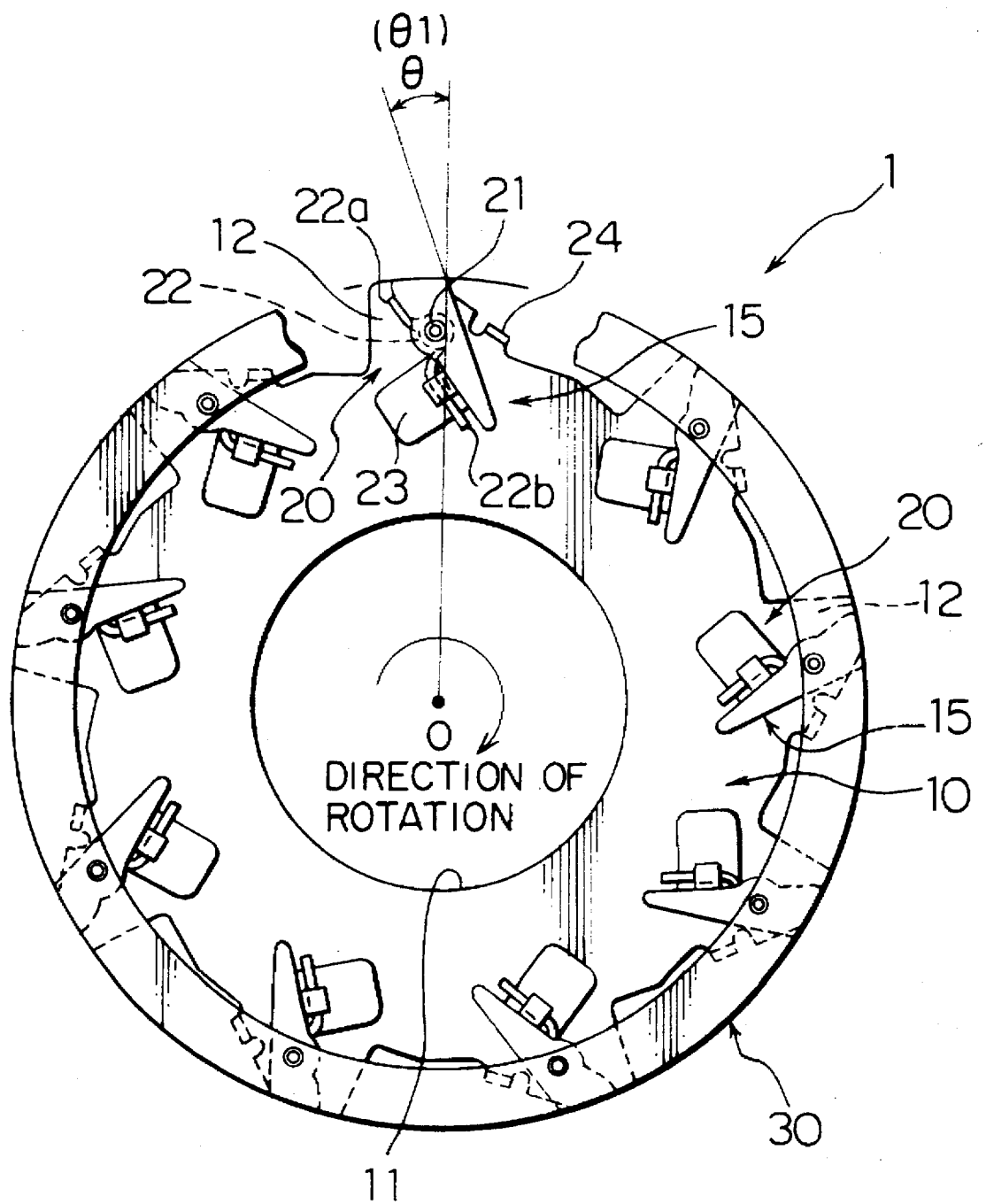
FIG. 1 is a top plan view of a rotary fan according to a first embodiment of the invention.

Now, the present invention will be described in detail in conjunction with preferred or exemplary embodiments thereof by reference to the drawings. In the following description, like reference characters designate like or corresponding parts throughout the several views. Also in the following description, it is to be understood that such terms as "front", "rear", "left", "right", "top", "bottom", "upwardly", "downwardly" and the like are words of convenience and are not to be construed as limiting terms.

Embodiment 1

Figure 2:
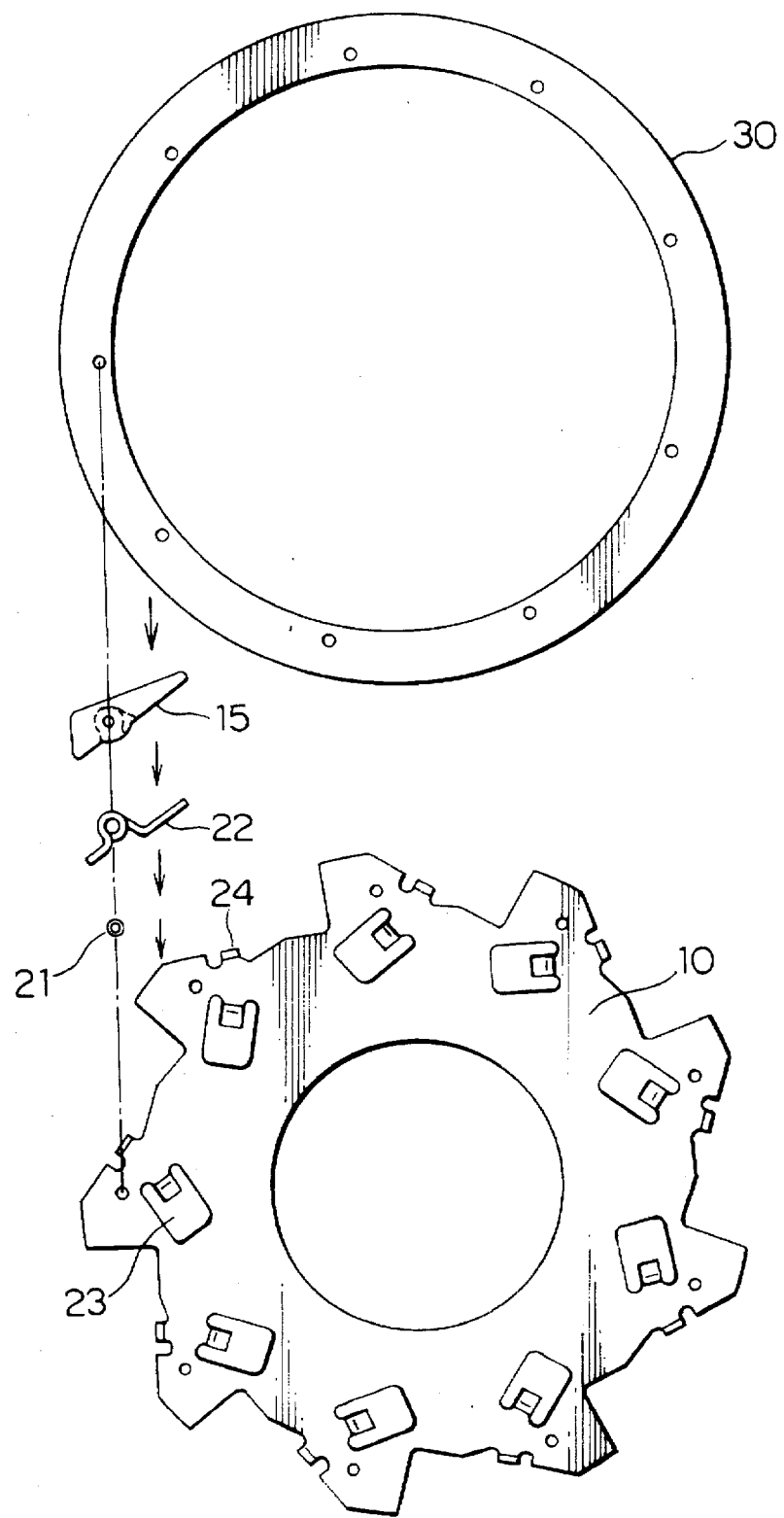
FIG. 2 is an exploded view of the same.
Figure 3:
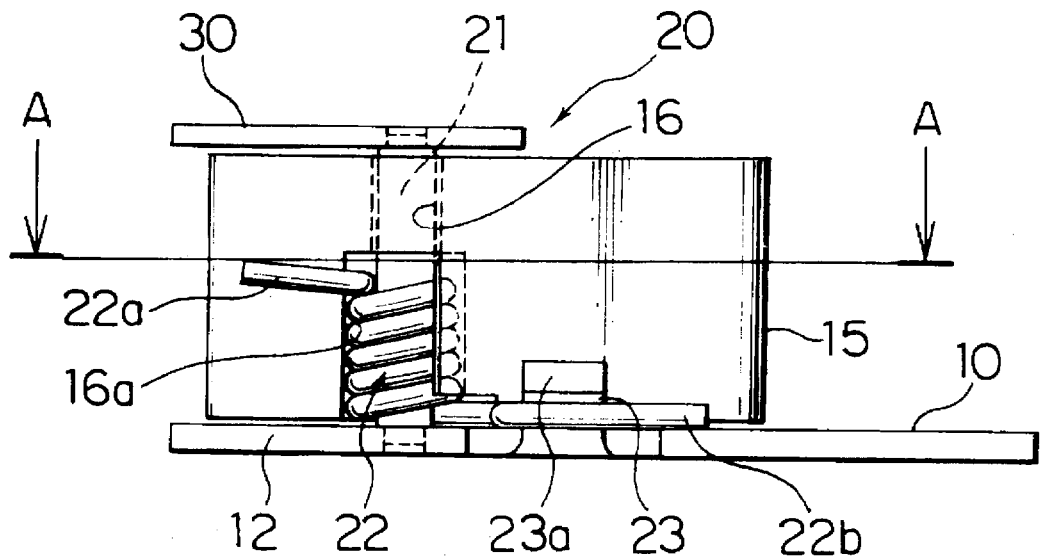
FIG. 3 is a side view showing a structure of a fan blade and a blade angle adjusting mechanism.
Figure 4:
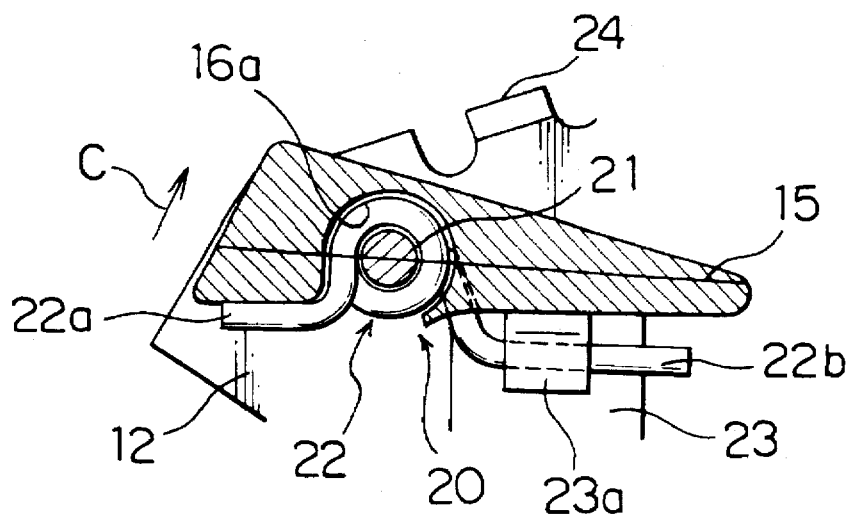
FIG. 4 is a sectional view taken along an arrow-affixed line A—A in FIG. 5.

FIGS. 1 to 4 show a structure of a rotary fan according to a first embodiment of the invention, in which FIG. 1 is a top plan view of the rotary fan, FIG. 2 is an exploded view of the same, FIG. 3 is a side view illustrating a structure of a fan blade and a blade angle adjusting mechanism, and FIG. 4 is a sectional view taken along an arrow-affixed line A—A in FIG. 3.

It is first to be mentioned that the rotary fan according to the instant embodiment of the invention is comprised of a rotatable base plate 10, a plurality of fan blades 15, a corresponding number of blade angle adjusting mechanisms 20 and a fan guide member 30.

The rotatable base plate 10 is formed of a sheet metal by press cutting or blanking or the like process and is formed with a coaxial circular aperture 11 of a relatively large diameter. Further, a plurality of radial projections 12 (nine projections in total in the case of the instant embodiment) are formed integrally with the rotatable base plate 10 along the outer periphery thereof. Each of the fan blades 15 is mounted on each of the projections 12 and supported rotatably by a supporting stud or pin 21.

The fan blade 15 is formed of a synthetic resin substantially in a triangular shape in cross section. Each of the fan blades 15 has a circular pin/coil accommodating recess 16 formed substantially in a center portion of the fan blade 15 and extends vertically, as viewed in FIG. 3, wherein the circular pin/coil accommodating recess 16 has an enlarged recess portion 16a opened in the bottom (as viewed in FIG. 3). The blade angle adjusting mechanism 20 is provided in combination with each of the fan blades 15.

Referring to FIGS. 3 and 4, the blade angle adjusting mechanism 20 is comprised of a torsion coil spring 22 serving as a resilient urging means and stoppers 23 and 24 which are referred to as the first and second stoppers, respectively. Of course, the urging means may be implemented by other spring instead of the torsion coil spring.

More specifically, the torsion coil spring 22 is accommodated within the enlarged recess portion 16a in the state in which a top end portion 22a of the torsion coil spring 22 engages with a rear side surface (hereinafter referred to as the suction surface) as viewed in the rotating direction of the rotary fan. The pin 21 is anchored to the projection 12 in such disposition that the supporting pin 21 extends through the torsion coil spring 22 fitted or housed within the circular pin/coil accommodating recess 16. The first stopper 23 is formed in the suction surface of the fan blade 15 and has a retaining portion 23a which retains a bottom end portion 22b of the torsion coil spring 22. With the structure described above, each of the fan blades 15 is resiliently urged in the direction indicated by an arrow C in FIG. 4 so as to abut against the first stopper 23. In this position of the fan blade 15, a lower limit value $\theta1$ is defined for the discharge angle $\theta$.

Further, the spring constant of the torsion coil spring 22 is selected such that the urging force of the torsion coil spring 22 becomes smaller than the centrifugal force F applied to the center of gravity G of the fan blade 15 when the rotation speed of the rotary fan 1 exceeds a first predetermined rotation speed N1 (e.g. 4000 rpm), as will be described in detail later on.

On the other hand, the second stopper 24 is formed in the rotatable base plate 10 in the vicinity of the projection 12 and projects upwardly from the plane of the rotatable base plate 10. More particularly, the second stopper 24 is provided at such a position that the discharge angle of the fan blade 15 is limited to a upper limit angle $\theta2$ when the rotation speed of the rotary fan 1 has attained a second predetermined rotation speed N2 (e.g. 7000 rpm), which will be described hereinafter by reference to FIG. 7.

The fan guide member 30 of a ring-like shape is mounted on the rotatable base plate 10 by means of the supporting pins 21 at the top ends of the fan blades 15 each equipped with the blade angle adjusting mechanism 20 in order to ensure high rigidity of the rotary fan 1 and high operation efficiency thereof. To be more concrete, the fan guide member 30 is fixedly secured to one ends of the supporting pins 21 having the other ends secured to the rotatable base plate 10 by welding.

Now, description will turn to operation of the rotary fan according to the instant embodiment of the invention.

Figure 5:
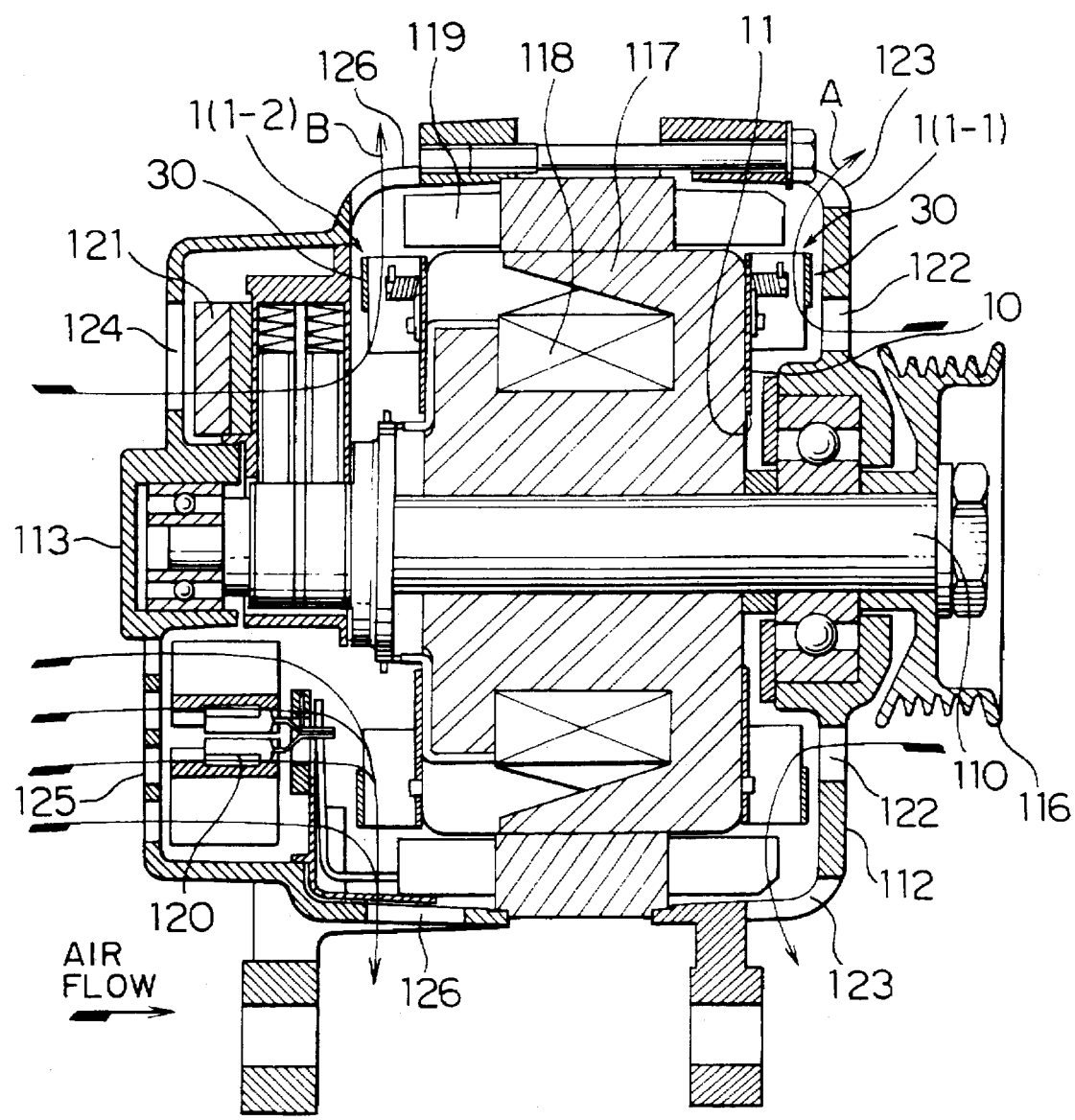
FIG. 5 is a sectional view showing an AC generator for a motor vehicle in which a rotary fan according to the first embodiment of the invention is employed.
Figure 6:
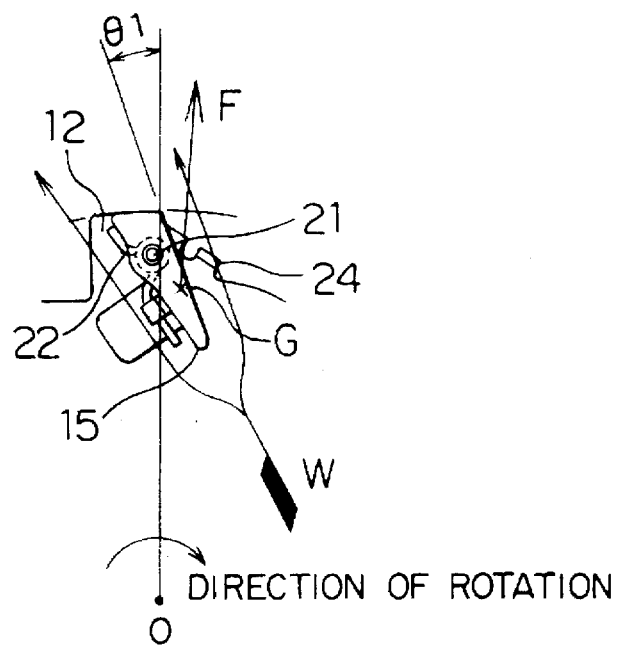
FIG. 6 is a top plan view for illustrating orientation of a fan blade when rotation speed of the rotary fan is below a first predetermined rotation speed.
Figure 7:
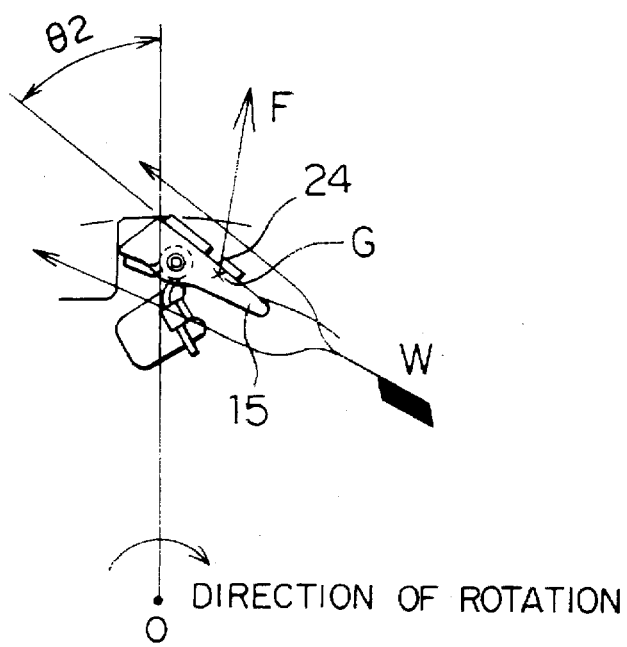
FIG. 7 is a top plan view for illustrating orientation of the fan blade when the rotation speed is beyond a second predetermined rotation speed.
Figure 8:
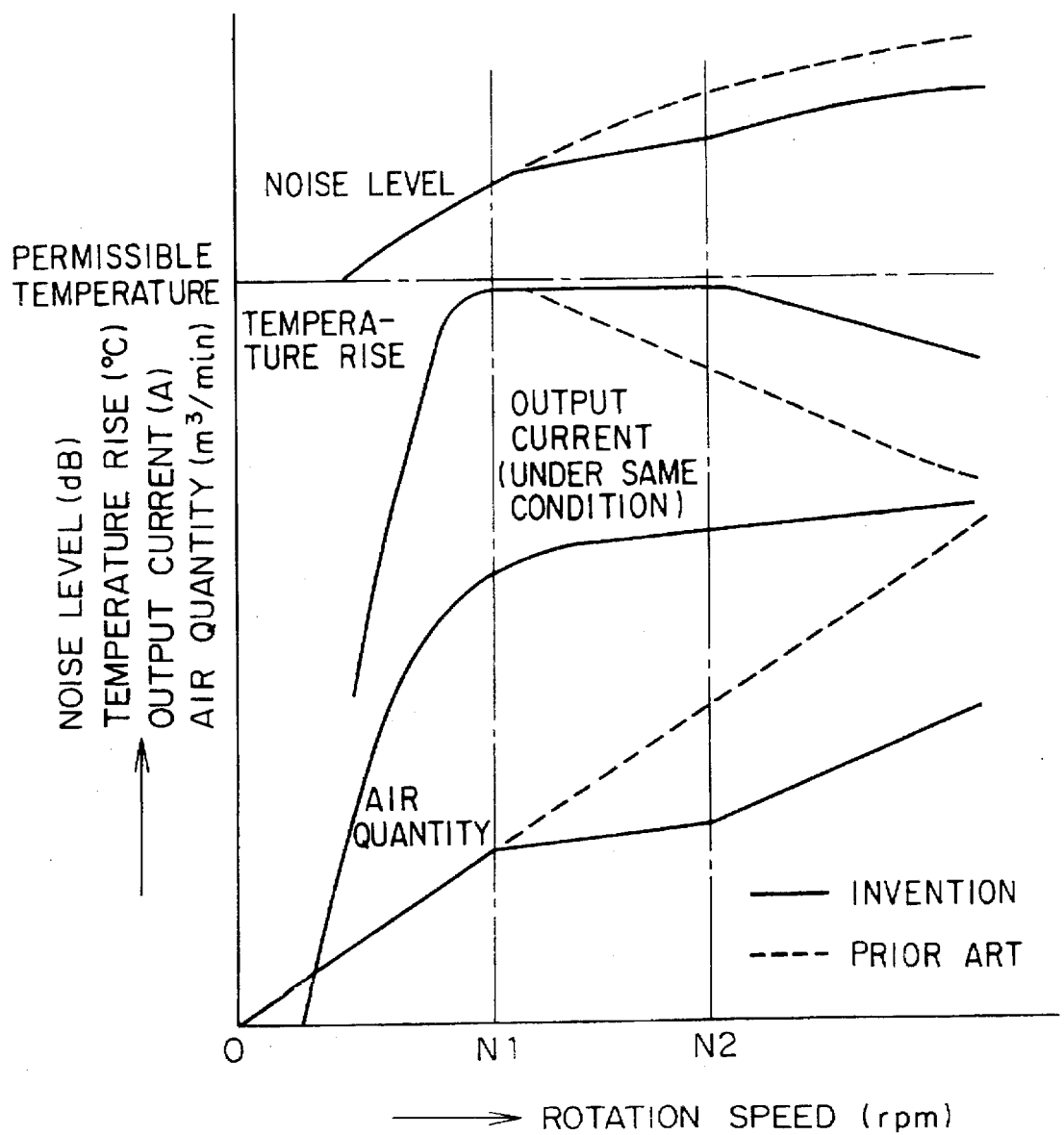
FIG. 8 is a characteristic diagram illustrating characteristics of air quantity as produced by the rotary fan, output current of an AC generator, temperature rise thereof and noise level generated by the AC generator.

FIG. 5 is a sectional view showing an AC generator for a motor vehicle in which the rotary fan according to the instant embodiment of the invention is employed, FIG. 6 is a top plan view for illustrating orientation of the fan blade when the rotation speed of the rotary fan is below the first predetermined rotation speed N1, FIG. 7 is a top plan view for illustrating orientation of the fan blade when the rotation speed is beyond the second predetermined rotation speed N2, and FIG. 8 is a characteristic diagram illustrating characteristics of the air quantity, output current of the AC generator, temperature rise thereof and noise level as generated.

Reference is first made to FIG. 5. Starting from the state in which the fan guide member 30 is disposed to face the front bracket 112, the rotatable shaft 110 is inserted through the circular aperture 11 of the base plate 10, whereupon the base plate 10 is secured to the magnetic core assembly 117 at the front side thereof. One rotary fan (denoted by 1-1 in FIG. 5) realized according to the instant embodiment of the invention can thus be fixedly mounted in the AC generator. Similarly, another rotary fan (designated by 1-2 in FIG. 5) is mounted on the rotatable shaft 110 in the disposition in which the fan guide member 30 faces the rear bracket 113. Upon operation of the engine (not shown), the rotatable shaft 110 is driven by the engine via the belt and the pulley 116.

whereby the rotary fans 1-1 and 1-2 are caused to rotate together with the magnetic core assembly 117.

When the rotary fan 1-1 is rotated, the ambient air flows into the AC generator through the intake port 122, as indicated by arrows A, to carry away heat from the excitation winding 118 and the stator winding 119 and flows out through the outlet ports 123. On the other hand, under the action of the rotating fan 1-2, the ambient air flows into the AC generator through the intake ports 124 and 125 formed in the rear bracket 113 to cool the rectifier 120 and the voltage regulator 121 and then flows out through the outlet ports 126.

As the rotation speed of the rotary fan 1 (1-1 and 1-2) increases in accompanying increase in the rotation speed of the rotatable shaft 110, the fan blade 15 tends to displace angularly about the supporting pin 21 in the direction toward the second stopper 24 against the resilient urging force of the torsion coil spring 22 under the action of the centrifugal force F applied to the center of gravity G of the fan blade 15. However, so long as the rotation speed of the rotary fan remains lower than the first predetermined rotation speed N1 (e.g. 4000 rpm), the resilient force of the torsion coil spring 22 urging the fan blade 15 to rotate or swing around the supporting pin 21 is greater than the centrifugal force F applied to the center of gravity G of the fan blade 15. Thus, the suction surface of the fan blade 15 is maintained in the state abutting the first stopper 23 under the spring force of the torsion coil spring 22 so long as the rotation speed of the rotary fan 1 is smaller than the first predetermined rotation speed N1, whereby the discharge angle θ of the fan blade 15 is maintained at the lower limit value θ1. In this manner, in the range in which the rotation speed of the rotary fan is lower than the first predetermined rotation speed N1, the discharge angle θ of the fan blade 15 is maintained at the value θ1, as can be seen in FIG. 8. Within this range, the quantity of air flowing through the AC generator and the noise level will increase as a function of the rotation speed of the rotatable base plate 10 and hence that of the rotatable shaft 110. However, the noise as generated within this range can remain at a low or tolerable level. In that case, the temperature within the AC generator increases as the output current thereof increases and attains an extreme value at the first predetermined rotation speed N1. Accordingly, the lower limit discharge angle θ1 is so set that the temperature at the first predetermined rotation speed N1 remains within a permissible temperature range.

When the rotation speed of the rotatable base plate 10 or the rotatable shaft 110 increases toward the second predetermined rotation speed N2 beyond the first predetermined rotation speed N1, the centrifugal force F applied to the center of gravity G of the fan blade 15 overcomes the resilient urging force of the torsion coil spring 22, as a result of which the discharge angle θ of the fan blade 15 increases as a function of the centrifugal force F.

In this conjunction, it should be mentioned that the air W is caused to flow along both the side surfaces of the fan blade 15 in a laminar layer to be fed rearwardly as viewed in the direction in which the rotatable base plate 10 rotates, as can be seen from FIGS. 6 and 7. Thus, the fan blade 15 is prevented from undergoing any significant aerodynamic resistance, as can be seen from FIGS. 6 and 7.

As a result of increase of the discharge angle θ, the air quantity decreases within a range of the rotation speed between the first predetermined rotation speed N1 and the second predetermined rotation speed N2, as can be seen from FIG. 8. Thus, the level of noise generated by the rotary fan can significantly be suppressed as compared with that of the rotary fan 100 known heretofore represented by a broken line curve in FIG. 8) notwithstanding of high rotation speed. Consequently, the temperature will rise at a higher rate within a range below the permissible temperature when compared with that of the AC generator incorporating the rotary fans known heretofore on the assumption that the output current of the AC generator is same.

When the rotation speed of the rotary fan 1 has reached the second predetermined rotation speed N2, the fan blade 15 bears against the second stopper 24, whereby the discharge angle of the fan blade 15 is limited to the upper limit value θ2, as shown in FIG. 7. To say in another way, even when the rotation speed of the fan blade 15 exceeds the second predetermined rotation speed N2, the discharge angle of the fan blade is prevented from increasing beyond the upper limit angle θ2. Thus, the quantity of air flow increases only gently, being accompanied with only a bit of increase in the noise level. In other words, when compared with the AC generator equipped with the rotary fan of the hitherto known structure, the rate of increase in the air quantity can be suppressed in the speed range between the first predetermined rotation speed N1 and the second predetermined rotation speed N2. Thus, the noise level becomes considerably lower than that of the AC generator including the rotary fan of the hitherto known structure.

In this manner, when the AC generator of the structure shown in FIG. 5 is driven to rotate the rotary fan 1 at a high speed within the speed range between the first predetermined rotation speed N1 and the second predetermined rotation speed N2, there can be assured the air quantity required for cooling the AC generator even though the increasing rate of the air quantity decreases. Besides, since the air quantity can be suppressed to be low notwithstanding of increase in the rotation number of the AC generator, the latter can be operated without being accompanied with generation of noticeable noise.

As is apparent from the foregoing description, with the structure of the rotary fan 1 for the AC generator of the motor vehicle according to the instant embodiment of the invention, a sufficient air quantity for cooling effectively heat generating portions of the AC generator can be ensured in the low speed range (below the first predetermined rotation speed N1) where the temperature rise within the AC generator is high, while in the high-speed range (beyond the first predetermined rotation speed N1) where the air quantity need not be large, the air quantity is maintained small to suppress effectively the generation of noise.

In the case of an AC generator for the motor vehicle where a certain level of noise can be tolerated, the lower limit angle θ1 of the fan blade 15 may previously set at a small value to thereby increase the air quantity before the first predetermined rotation speed N1 is reached. In that case, the output power of the AC generator can correspondingly be increased.

Furthermore, by mounting rotatably the fan blade 15 at a position closer to the center of the rotatable base plate 10 as viewed in the longitudinal direction of the fan blade 15, the fan blade is caused to rotate in such direction in which the effective fan diameter defined by the outermost peripheral points on the fan blades tends to decrease as the rotation number of the rotatable base plate increases in the high-speed range, whereby the increasing rate of the air quantity can further be reduced, whereby generation of noise can be suppressed more effectively.

In the foregoing description, it has been assumed that the rotary fan 1 is provided with nine fan blade 15. However, the invention is never restricted to any particular number of the fan blades. In other words, the number of the fan blades 15 may be selected rather arbitrarily. Besides, the size (length) of the individual fan blades may differ from one to another and/or the angular direction between the adjacent fan blades in the circumferential distance may be made different so that in spectra of the noises as generated can be dispersed.

Further, in conjunction with application of the rotary fan 1 to the AC generator, it has been described that two rotary fans (1-1 and 1-2) are employed. It should however be understood that even with the single rotary fan, the action and effects contemplated to be achieved with the present invention can adequately be attained.

Embodiment 2

Figure 9:
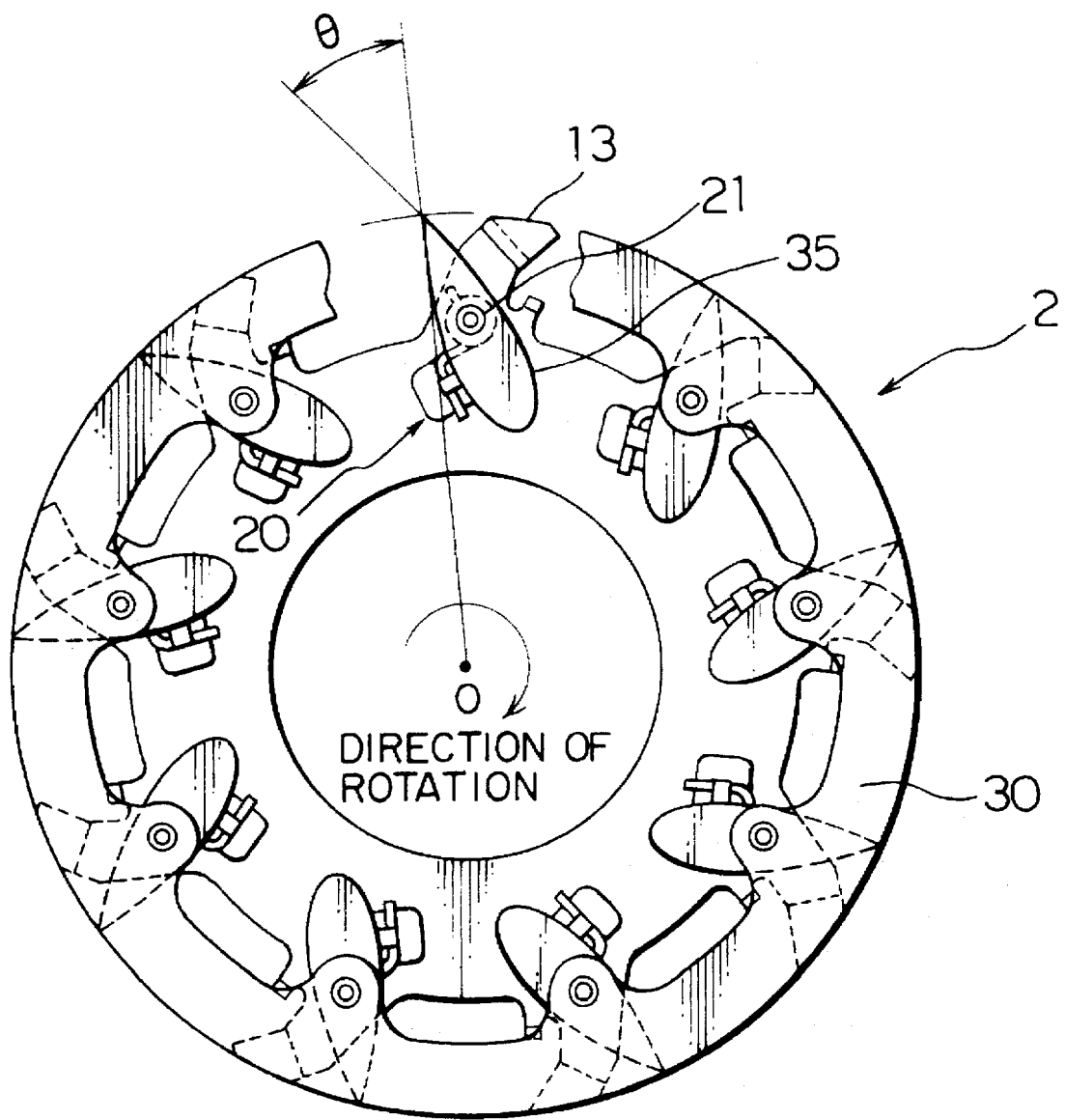
FIG. 9 is a top plan view showing a rotary fan according to a second embodiment of the invention.
Figure 10:
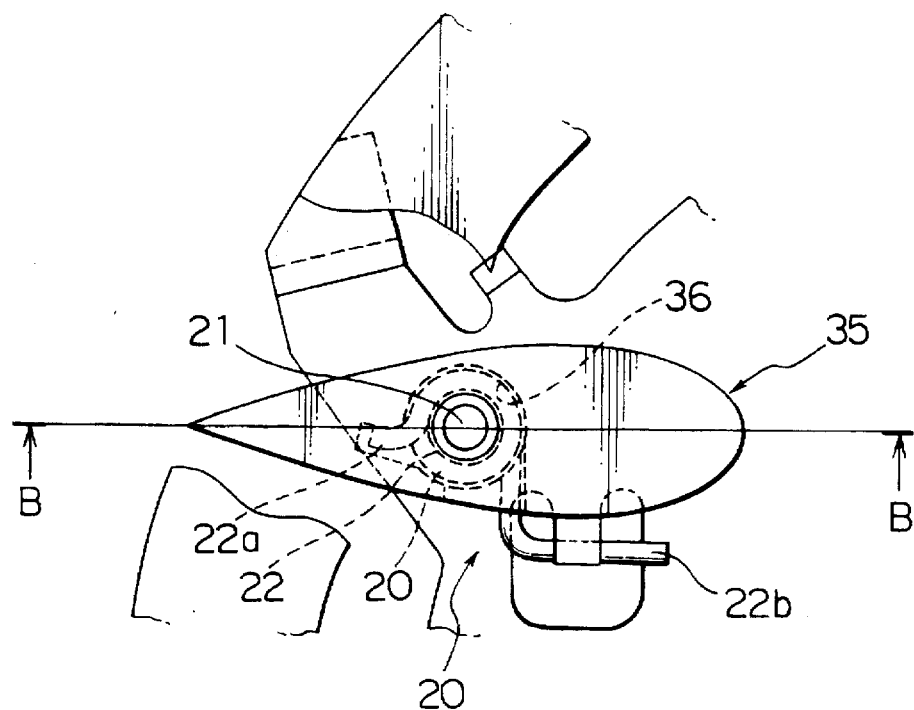
FIG. 10 is a top plan view showing a major portion of the rotary fan according to the second embodiment of the invention.
Figure 11:
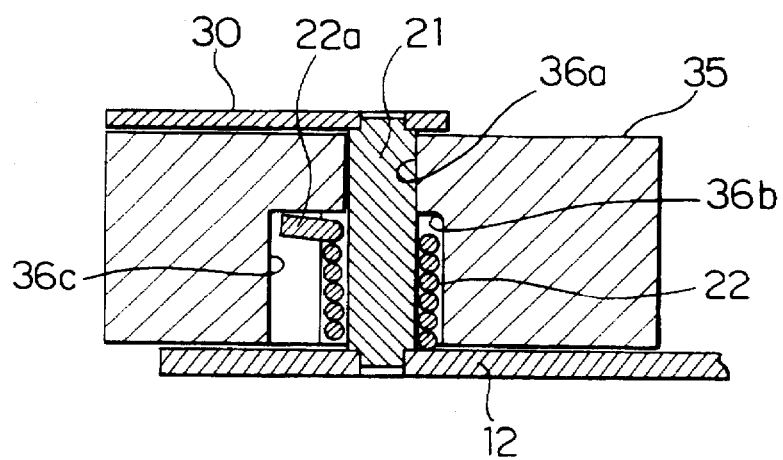
FIG. 11 is a sectional view of the same taken along an arrow-affixed line B—B in FIG. 10.
Figure 12:
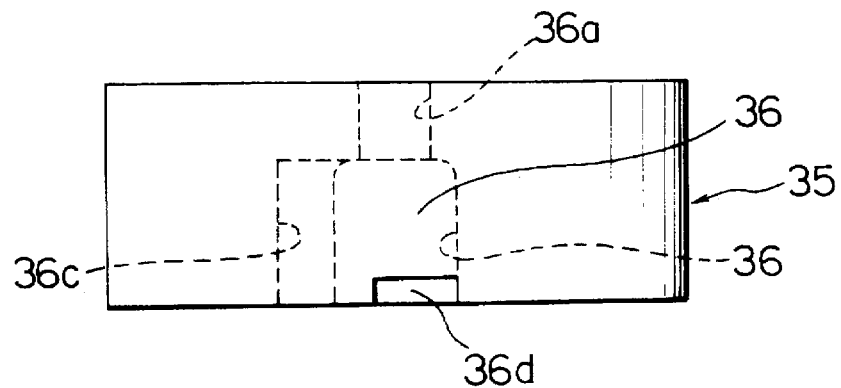
FIG. 12 is a front view of a fan blade of the rotary fan.
Figure 13:
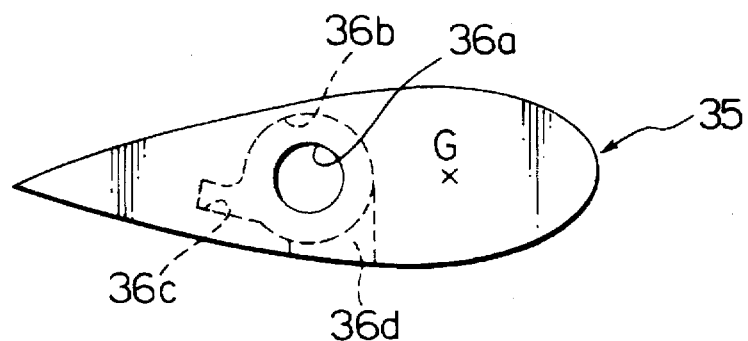
FIG. 13 is a top plan view of the same.
Figure 14:
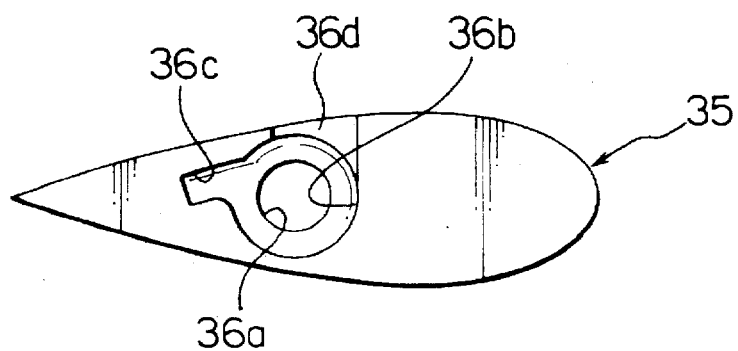
FIG. 14 is a bottom plan view of the same.

Next, a rotary fan according to a second embodiment of the invention will be described by reference to FIG. 9 to FIG. 14 in which FIG. 9 is a top plan view of a rotary fan according to the second embodiment of the invention, FIG. 10 is a top plan view showing a major portion of the same, FIG. 11 is a sectional view of the same taken along a line B—B in FIG. 10, FIG. 12 is a front view of a fan blade of the rotary fan, FIG. 13 is a top plan view of the same, and FIG. 14 is a bottom plan view of the same. In these figures, components same as or equivalent to those shown in FIGS. 1 to 8 are denoted by like reference characters.

The rotary fan according to the instant embodiment of the invention differs from that of the first embodiment in respect to the geometrical configuration and structure.

In the case of the rotary fan 2 implemented according to the second embodiment of the invention, each of the fan blades 35 having a streamline shape in cross section is combined with the blade angle adjusting mechanism 20.

As can be seen in FIGS. 10 and 11, the fan blade 35 has a pin/coil mounting hole 36 for accommodating a major portion of the torsion coil spring 22 constituting a major part of the blade angle adjusting mechanism 20. More specifically, referring to FIGS. 12 to 14, the circular pin/coil mounting hole 36 is formed in a center portion of the fan blade 35 so as to extend therethrough (in the vertical direction as viewed in FIG. 12) and includes a pin receiving portion 36a in which the supporting pin 21 can be inserted and a coil accommodating portion 36b formed in the center portion of the fan blade 35 underneath the pin receiving portion 36a.

A retaining notch 36c is formed in a side wall of the coil accommodating portion 36b to receive fixedly an upper end portion 22a of the torsion coil spring 22, while an aperture 36d is formed at a lower end portion of the coil accommodating portion 36b for leading out a lower end portion 22b of the torsion coil spring 22.

In this way, the torsion coil spring 22 can be housed within the fan blade 35. To be more concrete, the torsion coil spring 22 is placed within the coil accommodating portion 36b substantially invisibly from the outside with the upper end portion 22a being retained in the retaining notch 36c while the lower end portion 22b of the torsion coil spring is led out through the aperture 36d, as is shown in FIGS. 10 and 11. The supporting pin 21 is anchored onto the projection 12 in such disposition that it extends through the torsion coil spring 22. In this state, the lower end portion 22b of the torsion coil spring 22 led outwardly through the aperture 36d is retained against the first stopper 23.

Further, as can be seen from FIGS. 9 to 10, the supporting pin 21 for supporting rotatably the fan blade 35 of the structure mentioned above is displaced closer to the center of the rotatable base plate 10 when compared with the mounting position of the fan blade 15 in the rotary fan according to the first embodiment and disposed substantially at a base portion of the projection 12. Besides, the rotatable base plate 10 is provided with reinforcing plates 13 which are directly welded to the fan guide member 30 for reinforcing the bonding of the fan guide member 30 to the supporting pins 21.

Figure 15:
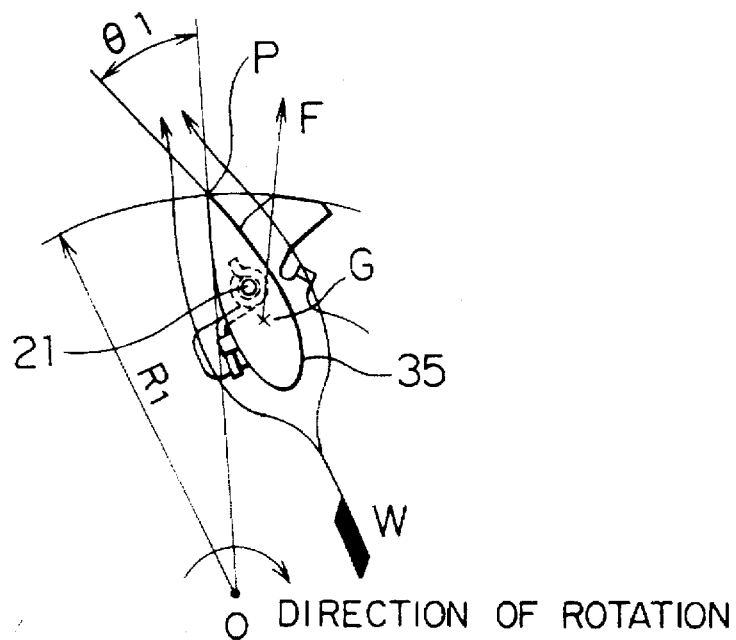
FIG. 15 is a top plan view for illustrating orientation of a fan blade when rotation speed of the rotary fan is below a first predetermined rotation speed.
Figure 16:
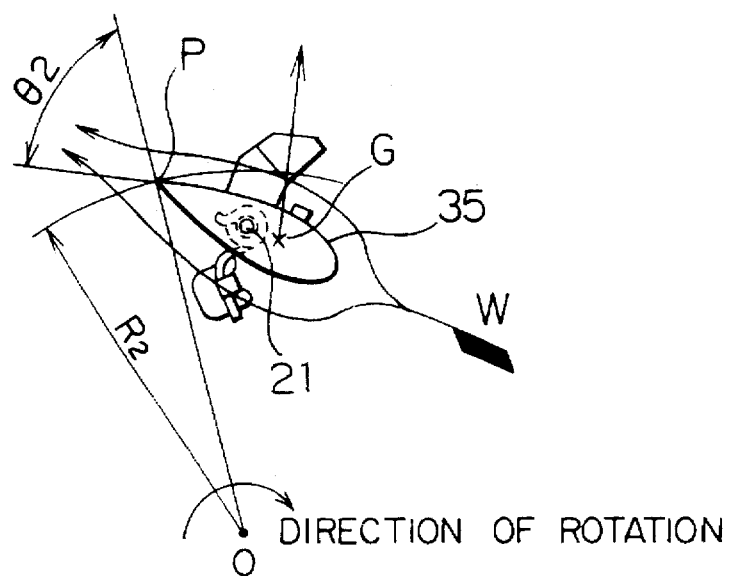
FIG. 16 is a top plan view for illustrating orientation of the fan blade when the rotation speed is beyond a second predetermined rotation speed.

In operation, when the rotary fan 2 is rotated, the discharge angle of the fan blade 35 changes from the lower limit angle $\theta1$ to the upper limit angle $\theta2$ within the speed range between the first predetermined rotation speed N1 and the second predetermined rotation speed N2 (FIG. 8), as shown in FIGS. 15 and 16. In that case, the air W can flow smoothly along both the side surfaces of the fan blade 35 without undergoing disturbance because of the streamline shape of the fan blade 35 in cross section. As a result of this, generation of the noise by the fan blade 35 can further be suppressed.

In the case of the rotary fan according to the first embodiment of the invention, the torsion coil spring 22 is partially exposed outwardly from the fan blade 15. Consequently, there is a possibility that the air stream is disturbed by the exposed portion of the torsion coil spring 22. By contrast, in the case of the rotary fan according to the second embodiment, a major portion of the torsion coil spring 22 is housed within the fan blade 35 without being exposed. Thus, any noticeable disturbance can not take place in the air flow. For this reason, the noise generation can further be reduced.

Besides, since the supporting pin 21 is mounted at a center portion of the fan blade 35 at a position closer to the rotatable base plate 10 as compared with the supporting pin 21 of the rotary fan according to the first embodiment, the effective radius of the rotary fan extending to the outer most peripheral point P decreases from a value R1 to R2 (see FIGS. 15 and 16) in the high-speed range between the first predetermined rotation speed N1 and the second predetermined rotation speed N2. Consequently, the air quantity decreases significantly in the high-speed range, contributing to significant reduction of the noise as generated by the rotary fan.

In other words, in the rotary fan according to the instant embodiment of the invention, the noise can be decreased more effectively when compared with the rotary fan according to the first embodiment.

With regards to other structural features and effects, the rotary fan according to the instant embodiment is similar to the first embodiment.

Embodiment 3

Figure 17:
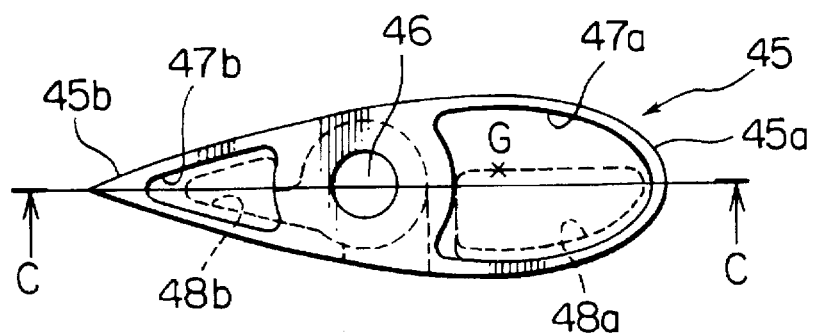
FIG. 17 is a top plan view of a fan blade used in a rotary fan according to a third embodiment of the invention.
Figure 18:
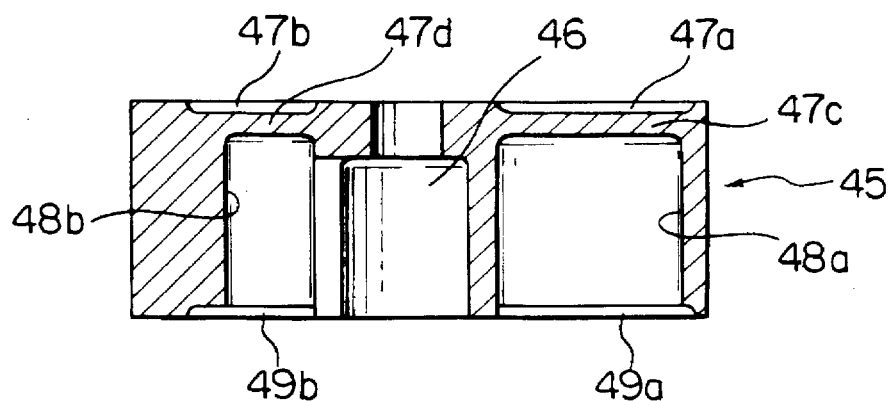
FIG. 18 is a sectional view of the same taken along an arrow-affixed line C—C in FIG. 17.
Figure 19:
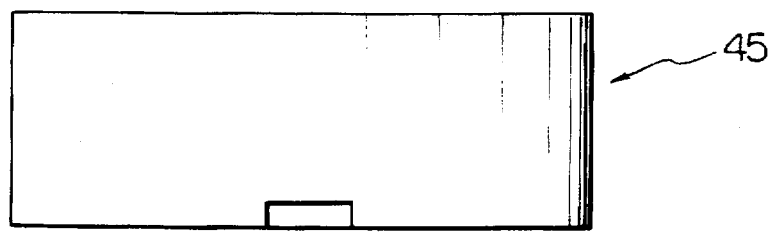
FIG. 19 is a front view of the same.
Figure 20:
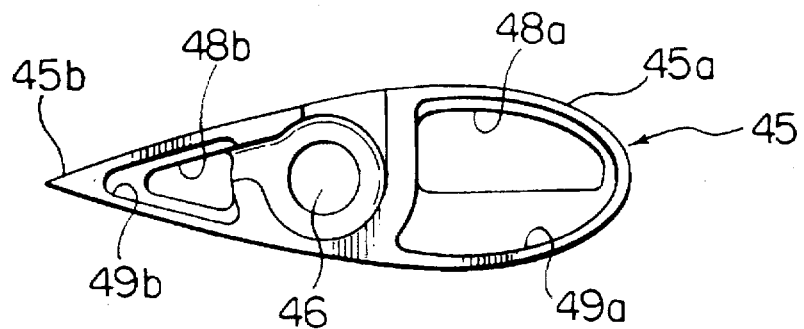
FIG. 20 is a bottom plan view of the same.

Next, description will turn to a rotary fan according to a third embodiment of the invention by reference to FIGS. 17 to 20, in which FIG. 17 is a top plan view of a fan blade used in the rotary fan according to the instant embodiment, FIG. 18 is a sectional view of the same taken along an arrow-affixed line C—C in FIG. 17, FIG. 19 is a front view of the same, and FIG. 20 is a bottom plan view of a fan blade.

The rotary fan according to the instant embodiment differs from that of the second embodiment in the respect that the material of the fan blade is partially removed to thereby displace the center of gravity from the center line of the fan blade.

Referring to the figures mentioned above, the fan blade 45 of the rotary fan according to the instant embodiment is provided with the circular pin/coil mounting hole 46 of a same structure as the circular pin/coil mounting hole 36 mentioned previously. However, the fan blade of the rotary fan according to the instant embodiment differs from that of the second embodiment in that cavities are formed in the top and upper surfaces as well as the interior of the blade body by removing the material thereof, as can best be seen in FIG. 18. To be more concrete, upper cavities 47a and 47b each of a small depth are formed in the top surface of the fan blade 45 at both sides of the circular pin/coil mounting hole 46 by removing the material from the blade body along the outer profile thereof, while lower cavities 49a and 49b are formed in the bottom surface of the fan blade 45 at both sides of the circular pin/coil mounting hole 46 by removing the material along the outer profile of the blade. Further, inner cavities 48a and 48b are formed underneath the upper shallow cavities 47a and 47b, respectively, with partition walls 47c and 47d intervening between the upper shallow cavity 47a and the inner deep cavity 48a and between the upper shallow cavity 47b and the inner deep cavity 48b, respectively.

The inner deep cavity 48a is formed by removing the blade material substantially from a half portion of a head of the fan blade 45 which is oriented obliquely toward the center of the rotatable base plate 10 so as to be communicated to the lower shallow cavity 49a, as is shown in FIGS. 17 and 20.

On the other hand, the inner deep cavity 48b is formed by hollowing an intermediate portion of a trail 44b of the fan blade 45 so as to be communicated to the lower shallow cavity 49b.

By leaving intact the material of the head portion 45a of the fan blade 45 at a location which is remote from the center of the rotatable base plate 10, as mentioned above, the center of gravity G of the fan blade 45 is deviated from the longitudinal center line interconnecting the head portion 45a and the trail portion 45b to be set at a position offset from the longitudinal center line outwardly in the radial direction of the rotatable base plate 10.

In this manner, the fan blade 45 according to the instant embodiment of the invention has a weight and the center of gravity which differ from those of the fan blade 35 in the rotary fan according to the first embodiment. Consequently, magnitude of the centrifugal force F applied to the center of gravity G of the fan blade 45 differs from that of the fan blade 35. Accordingly, the first predetermined rotation speed N1 at which the fan blade 45 can move away from the second stopper 24 necessarily differs from the second predetermined rotation speed N2 at which the fan blade 45 is caused to abut against the second stopper 24. To say in another way, by varying the weight and the center of gravity G of the fan blade in the manner described above, the rotation numbers corresponding to the first predetermined rotation speed N1 and the second predetermined rotation speed N2 can be changed rather arbitrarily. Besides, owing to implementation of the fan blade 45 in a light weight by hollowing partially the fan blade body as described above, the inertia mass of the fan blade 45 can be reduced, which in turn means that the spring force of the torsion coil spring can be set at a small value. Thus, the torsion coil spring of a small size and light weight can be employed. Additionally, owing to the partially hollowed structure of the fan blade, the centrifugal force as applied can be made smaller, whereby the mechanical strength or rigidity of the fan blade can be enhanced with the inertia of the AC generator being reduced, to further advantage.

The rotary fan according to the instant embodiment of the invention is essentially same as the second embodiment with regard to the other components. Accordingly, repeated description thereof will be unnecessary.

Embodiment 4

Figure 21:
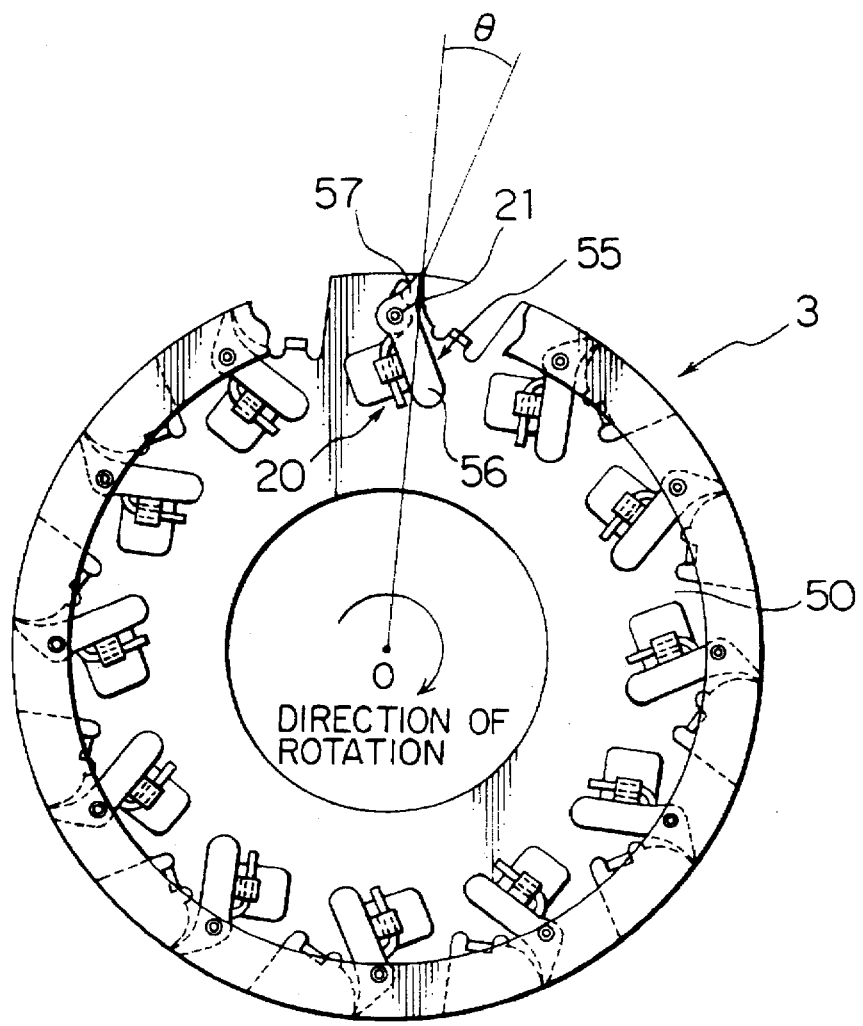
FIG. 21 is a top plan view showing a rotary fan according to a fourth embodiment of the invention.
Figure 22:
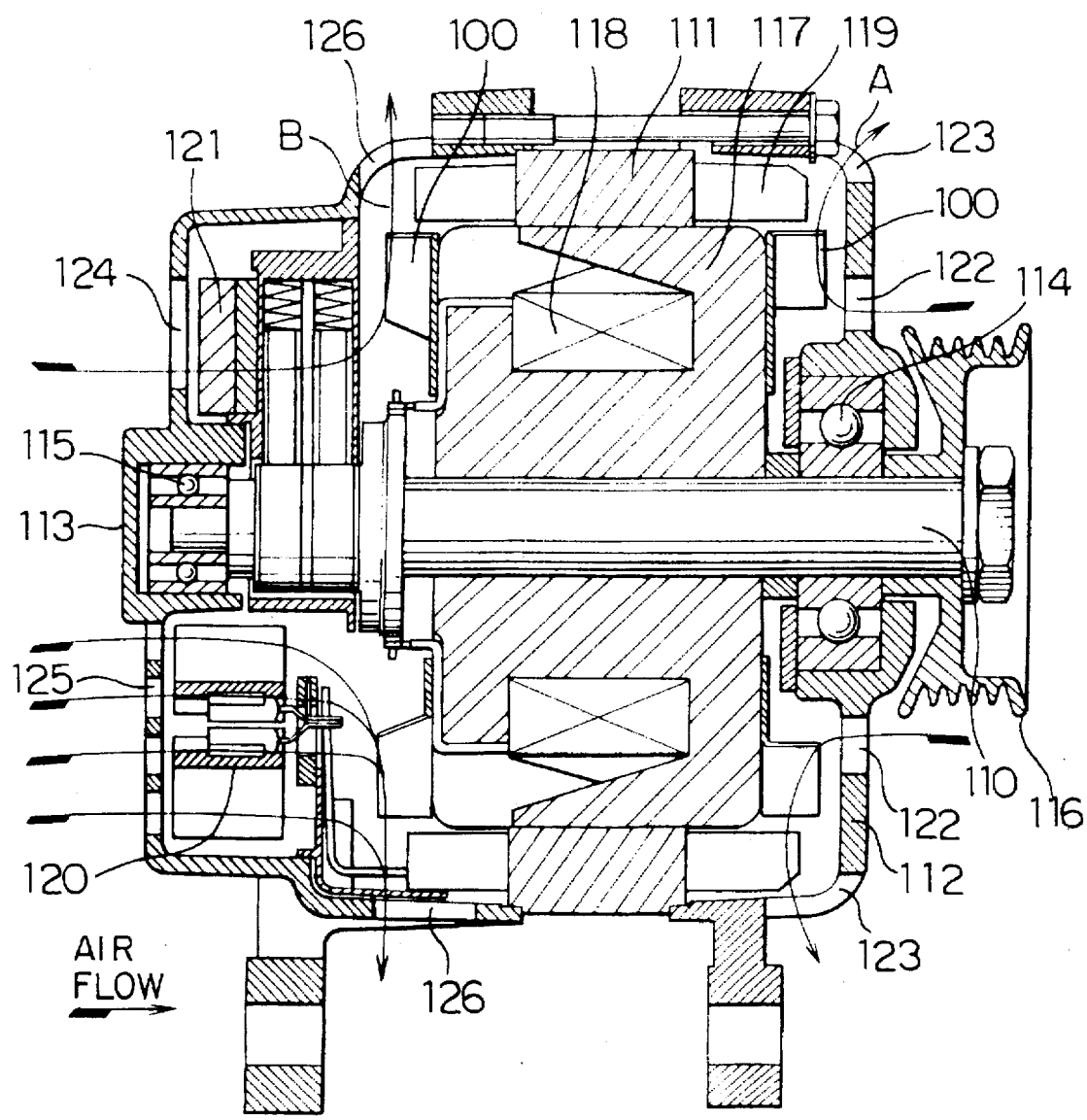
FIG. 22 is a sectional view of an AC generator for motor vehicle which is equipped with a rotary fan known heretofore.
Figure 23:
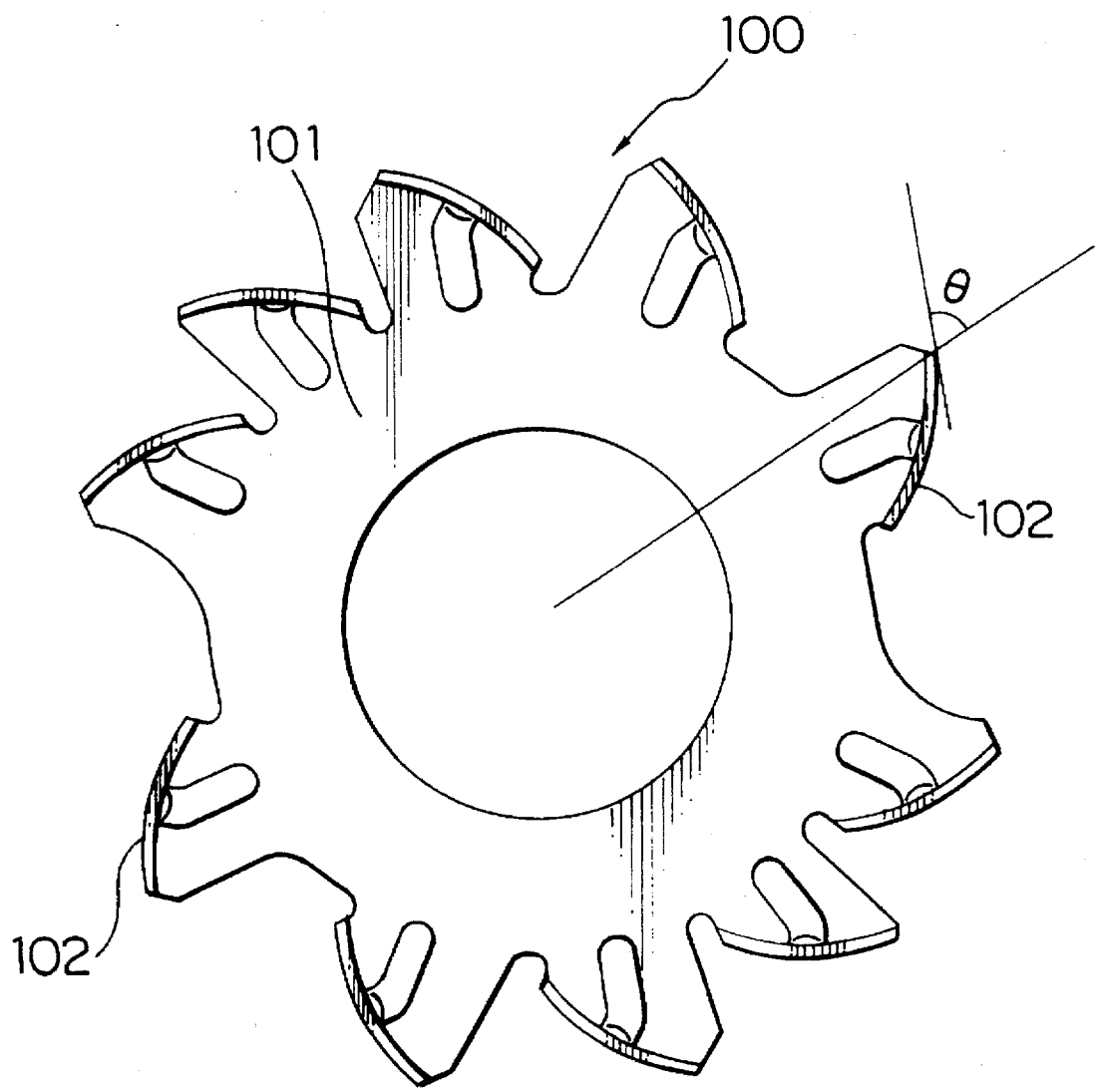
FIG. 23 is a plan view showing a structure of a rotary fan known heretofore.

Finally, a rotary fan according to a fourth embodiment of the invention will be described by reference to FIG. 21 which shows in a top plan view a rotary fan according to the fourth embodiment.

The rotary fan 3 now under consideration has fan blades 55 each differing from those of the rotary fans implemented according to the first to third embodiments of the invention in respect to the geometrical configuration and the center position of rotation. Namely, in the case of the rotary fan 3, the tangential direction at the outermost peripheral point on the blade surface at the front side of the fan blade 55 as viewed in the rotating direction of the base plate 50 is oriented frontward in the rotating direction of the base plate 50 relative to a straight line interconnecting the outermost peripheral point and the center of the rotatable base plate 50.

To be more concrete, the fan blade 55 is comprised of a blade portion 56 a part of which is approximately of an arcuate shape in cross section and a tapered base portion 57, wherein the arcuate surface of the blade portion 56 is oriented at the front side as viewed in the direction of rotation of the base plate, while the base portion 57 of the blade is pivotably mounted on the supporting pin 21 of the blade angle adjusting mechanism 20.

By virtue of the structure described above, the fan blade 55 is caused to rotate or swing around the pin in the direction to decrease the discharge angle θ when the rotation speed of the rotary fan 3 exceeds the first predetermined rotation speed N1.

Since the rotary fan according to the instant embodiment of the invention is similar to the first to third embodiments in respect to other structural features and the effects as achieved, any further description will be unnecessary.

Many features and advantages of the present invention are apparent from the detailed description and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. A rotary fan, comprising:
 a rotatable base plate;
 a plurality of fan blades mounted rotatably on said base plate at a peripheral portion thereof by means of supporting studs; and
 a blade angle adjusting mechanism mounted in association with each of said fan blades for allowing said fan blade to rotate pivotally about said supporting stud under a centrifugal force acting on said fan blade such that the rate of increase of said air quantity produced by said fan blade decreases as a rotation number of said rotatable base plate increases in a predetermined high-speed rotation range of said base plate, while in other rotation speed range outside of said high-speed rotation range, said blade angle adjusting mechanism acts to suppress the rotation of said fan blade around said supporting stud;
 wherein said blade angle adjusting mechanism includes:
  urging means for urging said fan blade in opposite direction to said centrifugal force applied to said fan blade;

first stopper means for limiting the rotation of said fan blade under the urging force of said urging means; and second stopper means for limiting the rotation of said fan blade taking place under the centrifugal force applied to said fan blade;

wherein a discharge angle defined by an angle formed between a straight line extending between an outermost peripheral point on a side surface of said fan blade located at a front side as viewed in a direction of the rotation of said rotatable base plate and a center thereof and a line extending tangentially to said outermost peripheral point is regulated in dependence on rotation number of said rotatable base plate within said predetermined high-speed rotation range; and wherein said urging means includes a torsion coil housed inside said fan blade and mounted around said supporting stud and having one end secured to said fan blade and the other end secured to one of said first and second stoppers formed in said rotatable base plate for limiting the rotation of said fan blade.

2. A rotary fan according to claim 1, wherein rotation speeds of said base plate which define said predetermined high-speed rotation range are determined by selectively forming a first cavity in an upper section of said fan blade to adjust a position of the center of gravity on the fan blade and a second cavity at a bottom section of said fan blade, and wherein a wall section prevents fluid communication between said first and second cavities.

3. A rotary fan according to claim 1, wherein a cross-sectional shape of said fan blade and a position of a center of rotation of said fan blade around said supporting stud are selected such that said discharge angle of said fan blade increases as said centrifugal force increases within said predetermined high-speed rotation range of said rotatable base plate.

4. A rotary fan according to claim 1, wherein a cross-sectional shape of said fan blade and a position of a center of rotation of said fan blade around said supporting stud are selected such that said discharge angle of said fan blade decreases as said centrifugal force increases within said predetermined high-speed rotation range of said rotatable base plate.

5. A rotary fan according to claim 1, wherein a cross-sectional shape of said fan blade and a position of a center of rotation of said fan blade around said supporting stud are selected such that a maximum effective diameter of the rotary fan defined by outermost peripheral points on front side surfaces of said fan blades as viewed in the rotational direction of said base plate decreases as said centrifugal force increases within said predetermined high-speed rotation range.

6. A rotary fan according to claim 1, wherein said urging means of said blade angle adjusting mechanism is housed within said fan blade.

7. A rotary fan according to claim 1, further comprising: a fan guide member fixedly secured to said supporting studs at one end thereof, the other ends of which are fixedly secured to said rotatable base plate.

8. A rotary fan according to claim 1, wherein each of said fan blades has a streamline contour in cross section.

9. An electric generator, comprising:
a stator assembly;
a rotor assembly having a shaft driven by a driving source; and at least one rotary fan mounted at an end surface of said rotor assembly so as to be rotatable together with said rotor assembly for producing a quantity of air flowing through the interior of said electric generator for cooling the same;

said rotary fan comprising:
a rotatable base plate;
a plurality of fan blades mounted rotatably on said base plate at a peripheral portion thereof by means of supporting studs; and
a blade angle adjusting mechanism mounted in association with each of said fan blades for allowing said fan blade to rotate pivotally about said supporting stud under a centrifugal force acting on said fan blade such that the rate of increase of said air quantity produced by said fan blade decreases as a rotation number of said rotatable base plate increases in a predetermined high-speed rotation range of said base plate, while in other rotation speed range outside of said high-speed rotation range, said blade angle adjusting mechanism acts to suppress the rotation of said fan blade around said supporting stud;

wherein said blade angle adjusting mechanism includes:
urging means for urging said fan blade in opposite direction to said centrifugal force applied to said fan blade;
first stopper means for limiting the rotation of said fan blade under the urging force of said urging means; and
second stopper means for limiting the rotation of said fan blade taking place under the centrifugal force applied to said fan blade;

wherein a discharge angle defined by an angle formed between a straight line extending between an outermost peripheral point on a side surface of said fan blade located at a front side as viewed in a direction of the rotation of said rotatable base plate and a center thereof and a line extending tangentially to said outermost peripheral point is regulated in dependence on rotation number of said rotatable base plate within said predetermined high-speed rotation range; and wherein said urging means includes a torsion coil housed inside said fan blade and mounted around said supporting stud and having one end secured to said fan blade and the other end secured to one of said first and second stoppers formed in said rotatable base plate for limiting the rotation of said fan blade.

10. An electric generator according to claim 9, wherein said high-speed rotation range is defined by a lower limit value and an upper limit value; and wherein said lower limit value is so selected that temperature of said electric generator does not exceed a permissible level, while said upper limit value is so selected that level of noise generated by said rotary fan is effectively suppressed from increasing.

11. A rotary fan, comprising:
a rotatable base plate;
a plurality of fan blades mounted rotatably on said base plate at a peripheral portion thereof by means of supporting studs; and
a blade angle adjusting mechanism mounted in association with each of said fan blades for allowing said fan blade to rotate pivotally about said supporting stud under a centrifugal force acting on said fan blade such that the rate of increase of said air quantity produced by said fan blade decreases as a rotation number of said rotatable base plate increases in a predetermined high-speed rotation range of said base plate, while in other rotation speed range outside of said high-speed rotation range, said blade angle adjusting mechanism acts to suppress the rotation of said fan blade around said supporting stud;

wherein a cross-sectional shape of said fan blade has a protruding portion extending forward, in a direction of rotation of said rotary fan, from a tangential pivot line passing through said supporting stud, and wherein a position of a center of rotation of said fan blade around said supporting stud is selected rearwardly of said tangential line, such that said discharge angle of said fan blade decreases as said centrifugal force increases within said predetermined high-speed rotation range of said rotatable base plate; and wherein said discharge angle is defined by an imaginary line extending from the center of rotation of said base plate and passing through an outermost edge of said protruding portion and a second imaginary line extending tangentially to front surface of said protruding portion.

12. An electric generator, comprising:

a stator assembly;

a rotor assembly having a shaft driven by a driving source; and at least one rotary fan mounted at an end surface of said rotor assembly so as to be rotatable together with said rotor assembly for producing a quantity of air flowing through the interior of said electric generator for cooling the same;

said rotary fan comprising:

a rotatable base plate;

a plurality of fan blades mounted rotatably on said base plate at a peripheral portion thereof by means of supporting studs; and a blade angle adjusting mechanism mounted in association with each of said fan blades for allowing said fan blade to rotate pivotally about said supporting stud under a centrifugal force acting on said fan blade such that the rate of increase of said air quantity produced by said fan blade decreases as a rotation number of said rotatable base plate increases in a predetermined high-speed rotation range of said base plate, while in other rotation speed range outside of said high-speed rotation range, said blade angle adjusting mechanism acts to suppress the rotation of said fan blade around said supporting stud;

wherein a cross-sectional shape of said fan blade has a protruding portion extending forward, in a direction of rotation of said rotary fan, from a tangential pivot line passing through said supporting stud, and wherein a position of a center of rotation of said fan blade around said supporting stud is selected rearwardly of said tangential line, such that said discharge angle of said fan blade decreases as said centrifugal force increases within said predetermined high-speed rotation range of said rotatable base plate: and wherein said discharge angle is defined by an imaginary line extending from the center of rotation of said base plate and passing through an outermost edge of said protruding portion and a second imaginary line extending tangentially to front surface of said protruding portion.

* * * * *